United States Patent [19]

Pocholle et al.

[11] Patent Number: 4,927,223
[45] Date of Patent: May 22, 1990

[54] OPTIC FIBER CORRELATOR

[75] Inventors: Jean P. Pocholle, Arpajon; Michel Papuchon, Massy; Claude Puech, Longjumeau; Pierre Tournois, Le Rouret, all of France

[73] Assignee: Thomson-CSF, Paris, France

[21] Appl. No.: 218,861

[22] Filed: Jul. 14, 1988

[30] Foreign Application Priority Data

Jul. 17, 1987 [FR] France ............... 87 10120

[51] Int. Cl.$^5$ .................... G02B 6/26; G02B 6/42
[52] U.S. Cl. .................... 350/96.15; 350/96.12
[58] Field of Search ............. 350/96.15, 96.12

[56] References Cited

U.S. PATENT DOCUMENTS

| | | | |
|---|---|---|---|
| 4,775,214 | 10/1988 | Johnson | 350/96.15 |
| 4,776,660 | 10/1988 | Mahlein et al. | 350/96.15 |
| 4,824,199 | 4/1989 | Ukeu | 350/96.15 |

OTHER PUBLICATIONS

Applied Physics Letters, vol. 42, No. 7, Apr., 1983, pp. 556-558, American Institute of Physics, New York, U.S.A.; K. P. Jackson et al.
Applied Physics Letters, vol. 36, No. 4, 15 Feb. 1980, pp. 253-255, American Institute of Physics, New York, U.S.A.; R. Normandin et al.

Primary Examiner—William L. Sikes
Assistant Examiner—Robert E. Wise
Attorney, Agent, or Firm—Oblon, Spivak, McClelland, Maier & Neustadt

[57] ABSTRACT

An optic fiber correlator having a first laser and a second laser emitting with the same frequency and with an amplitude modulated respectively by a first and second signal which are correlated. The correlator also has an optic fiber with its two ends respectively coupled to the two lasers and a length which is at least equal to the length corresponding to the maximum duration of the signals which are to be correlated and the optic fiber has a flattened surface throughout its length. A thin layer of non-centrosymmetrical structure material is applied to the flattened surface throughout the length of the fiber and light emitted by the layer is collected at a frequency which is twice the frequency of the two lasers in order to provide an electric signal which is the function of the intensity of the light and this electric signal expresses the correlation integral of the two correlated signals.

5 Claims, 2 Drawing Sheets

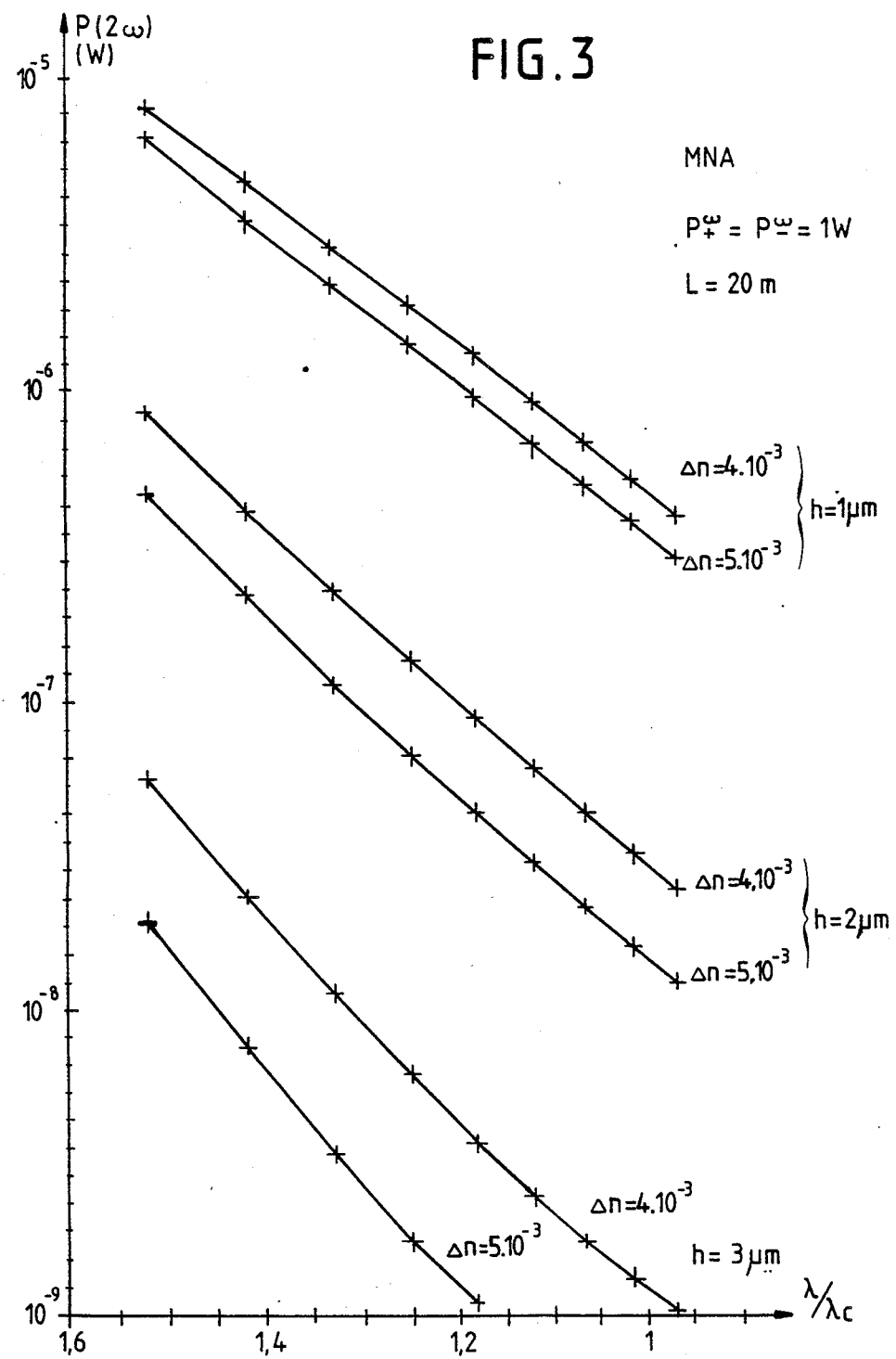

OPTIC FIBER CORRELATOR

BACKGROUND OF THE INVENTIONS

1. Field of the Invention

The invention concerns an optic fiber correlator used to give an electrical signal that expresses the correlation of two electrical signals to be correlated, for example, a pulse received by a radar and a reference pulse.

2. Description of the Prior Art

In radar, there are known methods for correlating two signals with a delay of about 10 to 100 nanoseconds, using logic gates and delay lines. However, this method becomes extremely complex for delays of about 10 nanoseconds and it is impossible to use it for delays that are much shorter than 10 nanoseconds.

A known method for making an optical correlation for very small delays of about 100 picoseconds uses a device comprising:

- a first laser diode and a second laser diode emitting on a same frequency and with an amplitude modulated respectively by the two signals to be correlated;
- an optical guide made of a $LiNbO_3$ crystal, the two ends of this guide being coupled respectively to two laser diodes;
- a photomultiplier to collect the second harmonic emitted by the crystal, the intensity of this second harmonic expressing the correlation between the two signals modulating the light from the two laser diodes respectively.

A device of this type is described by R. NORMANDIN and G. I. STEGEMAN in "Picosecond Signal Processing with Planar Nonlinear Integrated Optics", Appl. Phys. Lett. 36(4), 15 February 1980, p. 253, and by P. J. VELLA, R. NORMANDIN, G. I. STEGEMAN in "Enhanced Second Harmonic Generation by Counter-Propagating Guided Optical Waves", Appl. Phys. Lett 38(10), 15th May 1981, p. 759.

A $LiNbO_3$ monocrystal cannot be more than a few centimeters long. It enables the envisaging of correlation between two signals for delays of smaller than 1 nanosecond or even in the range of one picosecond, but is not suitable in the 1–10 nanosecond range because the length of the crystal that can be made is not sufficient to be equal to the length corresponding to the propagation time of a pulse when this time is greater than or equal to one nanosecond.

The aim of the invention is to make a correlator which can be used to correlate two signals consisting of pulses having a duration of about 1 to 10 nanoseconds. The object of the invention is a correlator comprising an optic fiber in which two light signals expressing the two electrical signals to be correlated are propagated in opposite directions, said optic fiber comprising a flattened surface in contact with the surface of a thin layer of nonlinear material to emit a second harmonic, the amplitude of which expresses the correlation integral of the two signals.

SUMMARY OF THE INVENTION

According to the invention, an optic fiber correlator comprises:

- a first laser and a second laser emitting with a same frequency and with an amplitude modulated respectively by a first signal and a second signal to be correlated;
- an optic fiber with its two ends respectively coupled to the two lasers and having a length which is at least equal to the length corresponding to the maximum duration of the signals to be correlated, said optic fiber comprising, throughout its length, a part with its diameter reduced to let through an evanescent wave associated with the guided mode;
- a layer of non-centrosymmetrical type material in contact with the part having a reduced diameter, throughout the length of the fiber;
- means to collect the light emitted by the layer at a frequency which is twice the frequency of two lasers, and to give an electrical signal which is a function of the intensity of said light, this electrical signal expressing the correlation integral of the two signals to be correlated.

BRIEF DESCRIPTION OF THE DRAWINGS

FIG. 3 shows graphs illustrating the operation of several alternative forms of this embodiment.

DETAILED DESCRIPTION OF THE PREFERRED EMBODIMENT

Figure 1:
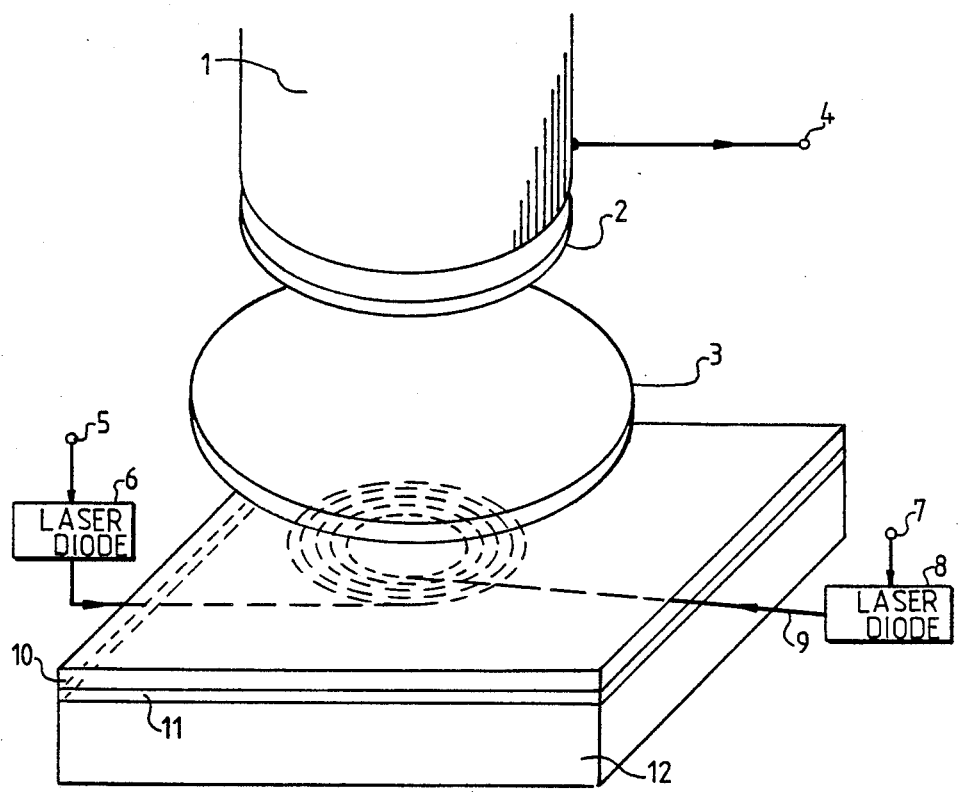
FIG. 1 shows a schematic view of the embodiment of the correlator according to the invention.

In FIG. 1, the embodiment shown has: two input terminals, 5 and 7, for the electrical signals to be correlated; two laser diodes, 6 and 8, emitting on one and the same frequency and at an amplitude which is modulated, respectively, by the two signals to be correlated; a monomode optic fiber 9, the two ends of which are respectively coupled to the two laser diodes 6 and 8; a plane support 12 on which the optic fiber 9 is coiled in concentric turns; a thin layer 10 of non-centrosymmetrical type material, the optic fiber 9 being bonded so as to be sandwiched between the support 12 and the layer 10; a lens 3 surmounting the layer 10 to collect the light emitted by this layer 10; a filter 2 filtering the second harmonic; a photomultiplier 1 receiving the second harmonic transmitted by the filter 2; and an output terminal 4 giving an electrical signal coming from the photomultiplier 1 and expressing the correlation integral of the two signals to be correlated.

Figure 2:
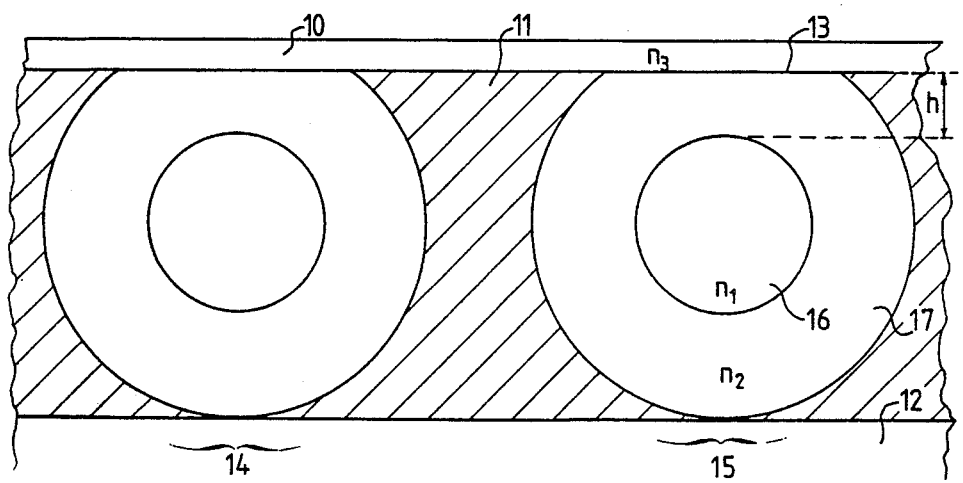
FIG. 2 shows a more detailed view of a part of this embodiment.

FIG. 2 shows a section of a part of this embodiment, showing two turns 14 and 15, of the fiber 9 coiled between the layer 10 of non-centrosymmetrical material and the support 12. The fiber 9 has a flattened surface 13 all along its length. This flattened surface 13 is made by a grinding of the sheath 17 in order to reach the evanescent part of the guided mode. The flattened surface 13 is in contact, all along its length, with the surface of the layer 10. The space between the turns 14 and 15 is filled with a liquid having a refractive index with a value in between that of the indices $n_1$ and $n_2$, respectively, of the core 16 and the sheath 17 of the fiber 9, this index being equal, for example, to $(n_1 \cdot n_2)^{\frac{1}{2}}$. The layer 10 has an index $n_3$ which should be smaller than or equal to the index $n_1$ and which should be greater than or equal to the index $n_2$.

The flattened surface 13 enables the evanescent wave associated with the guided mode to interact with the nonlinear material of the layer 10. According to an alternative embodiment, the flattened surface 13 can be replaced by a uniform elimination of a part of the thickness of the sheath 17 of the fiber 9, a reduction in the external diameter of the sheath 17 of the optic fiber being made by means of a chemical attaching process.

In this example, the two laser diodes emit in the near-infrared range, at a wavelength of 1.06 microns for example, and the length of the fiber 9 is 20 meters, thus enabling a correlation of two signals consisting of pulses with a duration of 96 nanoseconds, taking into account the opto-geometrical parameters of the fiber used and taking into account the distance h between the sheath 17/core 16 interface and the layer 10 of nonlinear material.

The low transmission losses in a monomode fiber thus make it possible to envisage great lengths corresponding to pulse times of about 100 nanoseconds as well as to pulse times of about 1 nanosecond, the latter time corresponding to a propagation length of about 30 centimeters in an optic fiber.

In this example, the layer 10 of nonlinear material preferably consists of a crystal of 2-dimethyl 4-nitroaniline, also called MNA, having a thickness of a few microns.

It is also possible to form the layer 10 by a Langmuir-Blodgett film capable of producing a second harmonic in a direction perpendicular to the plane of the layer 10 when the light wave reaches this layer in this direction. This type of layer 10 has the advantage of being far easier to make than a layer of monocrystalline material such as MNA.

By making a model of the behaviour of the materials, it is possible to assess the power of the second harmonic that can be produced during the correlation between two light signals propagated in opposite directions in the optic fiber 9. Assuming that the nonlinear material deposited on the flattened surface 13 has an refractive index identical to that of the sheath 17 of the fiber 9, and overlooking the effects of interference on the harmonic wave generated by the layer 10 because it is very thin, it can be shown that the power of the second harmonic is given by the simplified formula:

$$P^{(2\omega)}(t) = c_{NL} \cdot P_+^{(\omega)} \cdot P_-^{(\omega)} \cdot U(t) \quad (1)$$
$$(W) \quad (W^{-1}m^{-1})(W)(W) \quad (m)$$

wherein the coefficient $C_{NL}$ depends on the opto-geometrical characteristics of the fiber 9, the flattened surface 13 and the nonlinear coefficient associated with the material of the layer 10; $P_+(\omega)$ and $P_-(\omega)$ are the powers emitted by the two laser diodes 6 and 8; and U(t) is equal to:

$$U(t) = \int_{-L/2}^{L/2} \left| U_+\left(t - \frac{x}{V_g}\right) \cdot U_-\left(t + \frac{x}{V_g}\right) \right|^2 \cdot dx \quad (2)$$

where $U_+(t)$ and $U_-(t)$ are the temporal profiles of the two signals to be correlated, $V_g$ is the group speed in the fiber 9 and L is the length of the fiber 9.

If the formulae (1) and (2) are compared with the formula giving the value U'(t) of a signal expressing the correlation integral of the signals $U_+(t)$ and $U_-(t)$:

$$U'(t) = V_g \int_{\infty}^{\infty} |U_+(2t - \tau) \cdot U_-(\tau)|^2 \cdot d\tau \quad (3)$$

with $$\tau = t + \frac{x}{V_g} \quad (4)$$

It would appear that the power of the second harmonic is proportionate to the correlation integral of the signals emitted at the two ends of the fiber 9, with a time compression of 2 related to the relative speed of the pulses since they interact in being propagated in opposite directions.

Nonlinear materials generally have a higher refractive index that that of the sheath 17 of the fiber 9 with, however, one exception, namely organic type materials. Should the nonlinear material have a higher index than that of the sheath 17, making a more elaborate model would also enable a computation of the power of the second harmonic.

FIG. 3 shows the graph of the power $P^{(2\omega)}$ of the second harmonic produced in an embodiment where the layer 10 consists of MNA; where the power emitted by each of the laser diodes, 6 and 8, is equal to one watt; where the length of the fiber is equal to 20 meters; for different values of the difference in indices $\Delta n = n_2 - n_1$; and for different values of the distance h between the flattened surface 13 and the fiber core 16/sheath 17 interface.

The power of the second harmonic is about $10^{-5}$ watts for a distance h of one micron and a wavelength $\lambda$ such that $\lambda/\lambda_c$ is equal to 1.53 where $/_c$ is the critical wavelength of the fiber 9. The efficiency of the device diminishes when $\lambda/\lambda_c$ diminishes or when the distance h increases or when the difference in index $\Delta n$ increases.

The device according to the invention can be used for numerous signal processing operations, especially in radar.

What is claimed is:

1. An optic fiber correlator comprising:
   a first laser and a second laser each emitting the same frequency and having an amplitude modulated respectively by a first signal and a second signal to be correlated;
   an optic fiber with its two ends respectively coupled to said two lasers and having a length which is at least equal to the product of light velocity in the fiber and the maximum duration of the signals to be correlated, said optic fiber comprising, throughout its length, a part with its diameter reduced to let through an evanescent wave associated with the guided mode;
   a layer of non-centrosymmetrical structure material in contact with the part having a reduced diameter, throughout the length of the fiber; and
   means to collect the light emitted by said layer at a frequency which is twice the frequency of said two lasers, and to give an electric signal which is a function of the intensity of said light, said signal being an output signal of said correlator.

2. A correlator according to claim 1 wherein the non-centrosymmetrical type of material consists of 2-dimethyl 4-nitroaniline, called MNA.

3. A correlator according to claim 1 wherein the layer of non-centrosymmetrical structure material is a Langmuir-Blodgett film.

4. A correlator according to claim 1 wherein the part with reduced diameter is a flattened surface made by grinding.

5. A correlator according to claim 1 wherein the part with reduced diameter is a circular part located entirely around the fiber and partially removed by a chemical attacking process.

* * * * *